(12) United States Patent
Schneider et al.

(10) Patent No.: US 6,711,136 B1
(45) Date of Patent: Mar. 23, 2004

(54) CODE-BASED FILTERING MECHANISM FOR REDUCING DATA-INDUCED LATCHING LOOPBACK IN DIGITAL DATA SERVICE DEVICE

(75) Inventors: Kevin W. Schneider, Huntsville, AL (US); Don A. Waring, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/336,873

(22) Filed: Jun. 18, 1999

(51) Int. Cl.$^7$ .............................................. G01R 31/08
(52) U.S. Cl. ................................ 370/249; 379/22.01
(58) Field of Search ................................ 370/241, 249, 370/251, 252, 264, 290, 292, 394; 379/22.01, 27.01

(56) References Cited

U.S. PATENT DOCUMENTS 5,247,690 A * 9/1993 Fain
5,301,207 A * 4/1994 Emerson et al.

* cited by examiner

Primary Examiner—Wellington Chin
Assistant Examiner—Brenda Pham
(74) Attorney, Agent, or Firm—Allen, Dyer, Doppelt, Milbrath & Gilchrist, P.A.

(57) ABSTRACT

To reduce the possibility of a data-induced latching loopback, a digital data services device integrates one or more digital control code-based filtering routines into a test code sequence-based latching loopback scheme. The filtering routines include a 'garbage' byte detection routine, a 'protected loopback' routine, and a 'preamble' routine. The 'garbage' byte detection routine is an intra-loopback establishment filtering routine that limits the type of customer data that may be received between sequences of repeated control bytes of a valid latching loopback sequence. The 'protected loopback' routine is a flag byte-based filtering routine for frame relay data, which controllably disables latching loopback for a prescribed period of time, whenever a predetermined character associated with frame relay customer data is detected. The 'preamble' routine is a repeated code based-mechanism that allows the timeout invoked in the frame relay protected loopback routine to be controllably terminated, so that latching loopback may be immediately re-enabled.

37 Claims, 6 Drawing Sheets

| NEXT STATE / CURRENT STATE | STATE 1 MONITOR STATE | STATE 2 SELECT STATE | STATE 3 ENABLE STATE | STATE 4 FEV STATE | STATE 5 LOOPBACK STATE |
|---|---|---|---|---|---|
| STATE 1 | | TIP VALID=1 | | | |
| STATE 2 | WATCHDOG =1 | TIP VALID=1 | LSC VALID=1 | | |
| STATE 3 | WATCHDOG =1 | TIP VALID=1 | | LBE VALID =1 | |
| STATE 4 | WATCHDOG =1 | TIP VALID=1 | | | FEV VALID =1 |
| STATE 5 | TIP VALID=1 | | | | |

| CURRENT STATE \ NEXT STATE | STATE 1 MONITOR STATE | STATE 2 PREAMBLE STATE | STATE 3 SELECT STATE | STATE 4 ENABLE STATE | STATE 5 FEV STATE | STATE 6 LOOPBACK STATE |
|---|---|---|---|---|---|---|
| STATE 1 | | PRB VALID =1 | | | | |
| STATE 2 | WATCHDOG =1 | | TIP VALID= 1 | | | |
| STATE 3 | WATCHDOG =1 | | TIP VALID= 1 | LSC VALID= 1 | | |
| STATE 4 | WATCHDOG =1 | | TIP VALID= 1 | | LBE VALID =1 | |
| STATE 5 | WATCHDOG =1 | | TIP VALID= 1 | | | FEV VALID =1 |
| STATE 6 | TIP VALID= 1 | | | | | |

CODE-BASED FILTERING MECHANISM FOR REDUCING DATA-INDUCED LATCHING LOOPBACK IN DIGITAL DATA SERVICE DEVICE

FIELD OF THE INVENTION

The present invention is application relates in general to digital telecommunication networks and systems, and is particularly directed to the integration of one or more digital control code-based filtering routines into a test code sequence-based latching loopback mechanism of a digital data device, for reducing and/or preventing a data-induced latching loopback condition.

BACKGROUND OF THE INVENTION

FIG. 1 diagrammatically illustrates a reduced complexity example of a telecommunications network for delivering digital data service (e.g., 64 Kpbs service) from a remote location to data terminal equipment at a customer (end user) site. The network includes a source of digital communication data, such as a DDS service unit 110, which is coupled to a communication path switch 112, shown as a digital access cross-connect system (DACS), that terminates a 'west' end of a T-carrier link (such as a T-1 fiber optic link) 111. It should be noted that data may be coupled to the end user by way of a variety of data service units, such as but not limited to office channel unit data ports (OCUDP)s, digital signal 0 data ports (DS0DP)s, data service unit data ports (DSUDP)s, digital data service terminals (DDST)s, data service unit/channel service units (DSU/CSU)s, and similar equipment, such as frame relay (FR) equipment with built-in interfaces, shown at 130.

The DACS 112 is operative to steer the (64 Kbps) data stream from the DDS service unit 110 into DS0 channels of the T-carrier link 111 for distribution to remote customers by means of a channel bank 114 that terminates an 'east' end of the T-1 link 111. For this purpose, the channel bank 114 includes an office channel unit (OCU) 115 that directs a respective DS0 channel over a 64 Kpbs connection 113 to a DSU/CSU 116. The DSU/CSU 116 is coupled over a link 117 to data terminal equipment (DTE) or user interface 118.

When maintenance is required on a data transport connection between the channel bank 114 and the customer's data terminal equipment 118, it is customary practice to employ a test unit 120 of a network operating center, which provides diagnostic and trouble isolation functions, for transmitting various (in-band) interrogation and test or control code sequences to one or more of the digital data devices installed along the digital data transport path. In the illustrated network, digital data devices 115, 116 monitor the data stream transmitted from the channel bank 114 for the presence of such control code sequences, and respond in accordance with the operational function dictated by a received control code sequence.

Where the test code sequence is defined to invoke a loopback, the digital data device responds by going into the particular type of loopback specified by the loopback control byte sequence. In the network diagram of FIG. 1, non-limiting examples of the loopback of interest include an OCU loopback at data path location 130, a channel loopback at data path location 132, or a DSU loopback at data path location 134. The loopback control code sequences may be defined in accordance with well known network specifications, such as AT&T publication Technical Reference TR 62310 "DS0 Digital Local Channel Description and Interface Specification", August 1993.

The particular sequences employed have names and abbreviations as described in ANSI T1.107-1995 document and include: Transmission in Progress ("TIP"), Loopback Select ("LSC"), Loopback Enable ("LBE"), and Far End Voice ("FEV"). Each of these control code sequences is a stream of repeated bytes, where the bytes are predefined. For an illustration of the use of such in-band code sequences to interrogate and/or control the operation of one or more telecommunication services channel units, attention may be directed to the U.S. Patents to S. Killian et al, Nos. 5,390,179 and 5,574,723, entitled: "Remote Provisioning of Telephone Channel Unit Using Inband Digital Code Sequences Transmitted Over Tandem Link," assigned to the assignee of the present application and the disclosures of which are herein incorporated.

FIG. 2 illustrates an example of a typical latching loopback test code sequence 210, that is comprised of a set of repeated individual code sequences, sequentially transmitted as: a TIP sequence 212—a don't care sequence X—an LSC sequence 214—a don't care sequence X—an LBE sequence 216—a don't care sequence X—a FEV sequence 218. The don't care byte sequences X that are transmitted between the control code sequences 212, 214, 216 and 218 may be of different lengths and have different byte values.

One TIP code sequence is the repeated byte sequence: S0111010, S0111010, ..., S0111010, where the TIP byte S0111010 is repeated sequentially a prescribed number of times (e.g., at least 35 times). The bit "S" is a don't care (or X) value. Similarly, according to the above-referenced TR 62310 document, the number of LSC bytes in a loopback select sequence may comprise at least 35 bytes; the number of LBE bytes in a loopback enable sequence may comprise at least 100 LBE bytes; and the number of FEV bytes in a far end voice sequence may comprise at least 32 bytes.

FIG. 3 is a state diagram showing the operation of a conventional latching loopback mechanism employed by a currently commercially available digital data device, such as an Adtran D4 OCU DP, manufactured by Adtran Corp., Huntsville, Ala., to respond to the latching loopback code sequence of FIG. 2. FIG. 4 shows a prior art state transition table associated with the state diagram of FIG. 3. As shown in the state diagram of FIG. 2, the digital data device of interest is initially in the monitor state 310.

During the course of the transmission of data over the network, if a prescribed majority M out of N TIP sequence (e.g., M/N=31/32) is detected by the digital data service device's control processor, a TIP VALID transition 312 is invoked, and the conditional operational state of the device transitions from its initial monitor state 310 to the select state 320. Namely, TIP VALID true means that M (e.g., 31) TIP bytes have been detected within a plurality of N (e.g., 32) sequential bytes being received from the digital data path.

Once in the select state 320, if a prescribed majority M out of N LSC sequence (e.g., M/N=31/32) is detected, an LSC VALID condition 322 is invoked, and the conditional operational state of the device transitions from the select state 320 to the enable state 330. While in the enable state 330, if a prescribed majority M out of LBE sequence (e.g., M/N=93/96) is detected, an LBE VALID transition 332 is invoked, and the device state transitions from the enable state 330 to the FEV state 340. Finally, in the FEV state 340, if a prescribed majority M out of LBE sequence (e.g., M/N=7/8) is detected, an FEV DETECTED condition 342 is invoked, and the device state transitions from the FEV state. 340 to the latching loopback state 350.

In order to exit the latching loopback state 350 (and return to the monitor state 310), a TIP VALID condition 312 must be asserted true, or a manual reset is required. Also shown in the state diagram of FIG. 3 are additional TIP VALID sequence paths 312 emanating from each of intermediate states 320, 330 and 340, and transitioning back to the select state 320. Pursuant to the TR 62310 document, the state diagram of FIG. 3 further contains respective 'watchdog' timer paths 360, for aborting the latching loopback procedure from any of intermediate states 320, 330, and 340, in order to reduce the probability of false loopback sequence detection from the contents of a monitored data stream.

A respective watchdog time path 360 is true (binary '1') when the watchdog timer expires before the next expected byte sequence has been detected. For example, when in the select state 320 the LSC sequence is expected. If LSC VALID 322 is not true after a prescribed period of time (e.g., 25 seconds) a watchdog time-out transition 360 is made back to the monitor state 310. Although the watchdog timer may have different values in each of the states of the state diagram 300, a respective watchdog timer path 360 typically uses the same time-out value for each state.

Historically, at digital communication data rates less than 64 Kbps, only seven out of every eight bits on the network were made available for the transport of customer data; the eighth (unused) data bit was set to a value of '1'. Operational and maintenance control mechanisms, such as the loopback mechanism described above, exploited this unused bit data format by using eight bit control sequences (having placing a '0' in the normally unused eighth bit position).

However, as the demand for higher-speed data increased, service providers began furnishing 64 Kbps 'clear channel' service, in which all eight bits of a DS0 channel are employed for the transport of customer data. As a consequence, it is now possible for one or more control codes, including those described above for latching loopback, to be contained in the customer data. Namely, with all eight bits being used for data transport, it is now possible for the data stream itself to unintentionally contain successive 'data' bytes that cause the activation of an operational condition, such latching loopback, which may result in a corruption or loss of data, (even though the possibility of such an occurrence in a random bit data stream is extremely small).

This may be understood with reference to the frame relay packet diagrams of FIGS. 5 and 6, whose data field may randomly produce the latching loopback test sequence described above. Once it has detected the entire latching loopback test sequence, the responding digital data device will go into a latching loopback state. When the digital data device is in such a latching loopback state, a relay couples a transmitter in the device directly to the receiver of the device. The digital data device is released from the latching loopback mode only in response to receipt of a TIP sequence or by a manual reset procedure.

More particularly, FIG. 5 shows a frame relay packet 230, which is comprised of a leading FLAG byte 232 ($7E_{HEX}$) followed by a HEADER field 234, a DATA field 232, a CRC field 238, and a packet-terminating FLAG byte 232. The FLAG byte 232, HEADER field 234, and the CRC field are not controlled by the user, but by network elements. However, since the DATA field 236 is user-determined, it is possible for a user to insert, intentionally or accidentally, a file or message containing the latching loopback enable sequence 210 of FIG. 2 within the frame relay packet DATA field, thereby producing a FR packet containing a test sequence 240, as shown in FIG. 6. In this instance, if subsequent user data does not contain a command for exiting the loopback condition (a TIP code sequence), the digital data device that has received the packet 240 will remain in a latched loopback state, until a manual reset occurs, which may require a technician to travel to the location of the digital data device.

As noted earlier, in order to reduce the probability of false loopback sequence detection from the contents of a monitored data stream, section 7.3.2 of the TR 62310 document suggests the use of a watchdog timer, as shown at 360 in the state diagram of FIG. 3. The TR 62310 document additionally specifies that customer equipment "NOT transmit the loopback test sequence", even though such a sequence may in-fact be valid 64 Kbps customer data. As an unintentional latching loopback may occur in the provider's network, there is a latching loopback problem—which is made even worse when the digital data devices are used in other data services such as frame relay service.

In the case of other data services, the data being transferred over the network may not have entered the network from the same type of service. For example, one network link could be a 64 Kbps DS0 connection and another network link could be a 1.536 Mbps, DS1 connection. Different connections are often used for internet service, where there is little, if any, control over the content of customer data. Indeed, it is possible to produce and send a latching loopback sequence in a single IP/UDP packet, where the sequence could originate anywhere on the internet. When an internet-originated sequence is received by a digital data unit, the digital data unit may become disconnected from the network, and cannot be reconnected until the latching loopback feature is manually disabled.

Were a latching loopback sequence to be transmitted on the internet in a malicious manner to a large number of digital data devices, a significant number of critical network connections could be temporarily disabled. This latching loopback problem can become acute for network operators providing 64 Kbps service, as reported in the Sep. 8, 1997 minutes of the Frame Relay Forum, item 97-077. Unfortunately, the above-referenced watchdog timer method suggested in the TR 62310 document for preventing false loopbacks for 64 kb/s service has been shown (in actual deployment) not to reduce the problem to an acceptable level.

SUMMARY OF THE INVENTION

In accordance with the present invention, the inability of a watchdog timer, per se, to significantly reduce the possibility of data induced latching loopbacks is effectively obviated by a new and improved code-based latching loopback control mechanism, which integrates one or more digital control code-based filtering routines into a test code sequence-based latching loopback scheme. As will be described, the filtering routines of the invention include a 'garbage' byte detection routine, a 'protected loopback' routine, and a 'preamble' routine.

The 'garbage' or 'invalid' byte detection routine is an intra-loopback establishment filtering routine that limits the type of customer data that may be received between sequences of repeated control bytes of a valid latching loopback sequence. The 'protected loopback' routine is a flag byte-based filtering routine for frame relay data, which is used to controllably disable latching loopback for a prescribed period of time, whenever a predetermined character associated with a frame of 64K frame relay customer data is detected. The 'preamble' routine is a repeated code based-mechanism that allows the timeout invoked in the frame relay protected loopback routine to be controllably terminated, so that latching loopback may be immediately re-enabled.

In accordance with the garbage byte detection routine, the select, enable and far end voice states of a conventional control code sequence-based latching loopback scheme, in addition to invoking a watchdog counter, count the occurrence of invalid (garbage) bytes in the received data stream. An invalid byte is any byte other than the control code pattern of the next expected byte in the latching loopback sequence, or a byte pattern of one or more one byte code exceptions, that have been determined not to affect the latching loopback mechanism. The number of invalid bytes is compared with a 'tolerance' count associated with the number of invalid bytes that can be received by the digital data services unit without having to abort the latching loopback routine. If the invalid byte count is reached before the next expected byte is validated for a state transition, the loopback routine is aborted.

To implement the loopback protection mechanism, the select, enable and far end voice states of a latching loopback sequence are modified to detect whether a received DS0 byte is a flag byte ($7E_{HEX}$). If so, the latching loopback sequence is aborted to the monitor state. Once aborted to the monitor state, the ability of the digital data service device to perform a control byte sequence-initiated latching loopback is inhibited for a prescribed period of time, by means of a byte counter which preferably counts received DS0 bytes up to the maximum length of a frame, which for frame relay is 8192 bytes.

To controllably terminate this loopback protection initiated time-out, during the monitor state, the control processor of the digital data service device executes a preamble routine, during which it looks for a valid 'preamble' control code sequence containing a plurality of preamble bytes. A preamble byte may correspond to an idle byte (S1111110), since an idle byte code is not a legitimate byte in random frame relay data. As with the other repeated bytes of a latching loopback sequence, only if a majority M out of N preamble code sequence is detected will a transition from the monitor state to the preamble state be invoked. When a valid preamble sequence has been detected, the DS0 byte counter used for the abort time-out of the loopback protection feature is immediately cleared, which allows the conditional operational state of the device to transition from the monitor state to the preamble state. Once in the preamble state, the latching loopback sequence may be detected.

DETAILED DESCRIPTION

Figure 1:
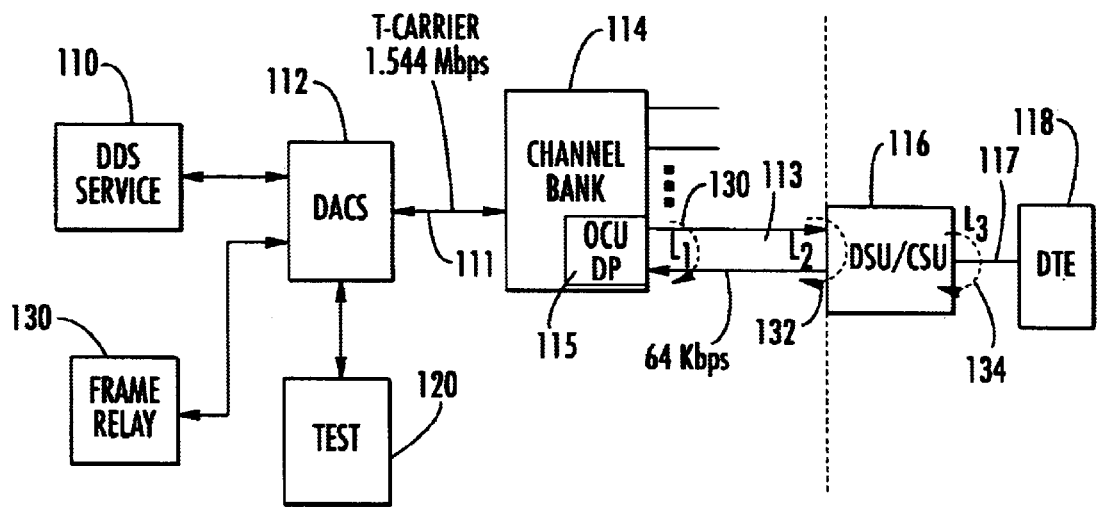
FIG. 1 diagrammatically illustrates a reduced complexity example of a telecommunications network for delivering 64 Kpbs digital data service from a remote location to data terminal equipment at a customer site.

Before describing in detail the new and improved data-induced latching loopback reduction mechanism in accordance with the present invention, it should be observed that the invention resides primarily in what is effectively a prescribed communications control mechanism that is executable in hardware or software of supervisory communications control components of conventional digital data services communication circuits, including digital signal processing components and attendant supervisory control circuitry therefor, that controls the operations of such circuits and components.

As a consequence, the configuration of such circuits and components and the manner in which they are interfaced with other communication system equipment have, for the most part, been illustrated in the drawings by readily understandable block and state diagrams, which show only those specific details that are pertinent to the present invention, so as not to obscure the disclosure with details which will be readily apparent to those skilled in the art having the benefit of the description herein. Thus, the diagrammatic illustrations are primarily intended to show the major components and functional operations of the invention in the context of a present day digital data services network in a convenient functional grouping, whereby the present invention may be more readily understood.

Figure 2:
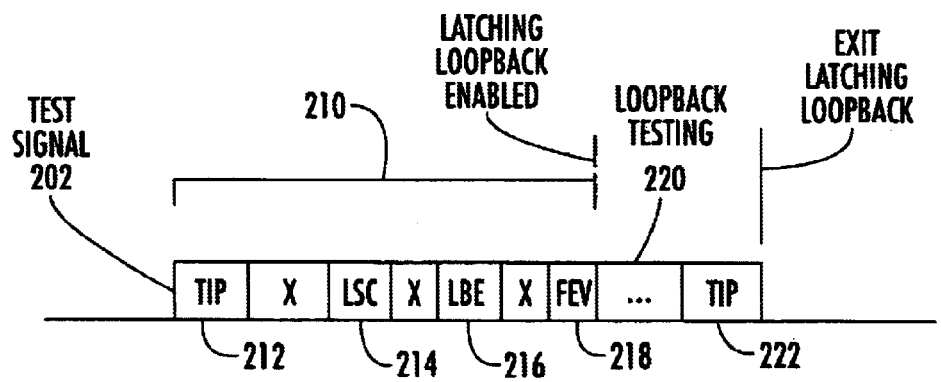
FIG. 2 illustrates a conventional latching loopback test code sequence comprised of a set of successively repeated different code sequences.

As pointed out briefly above, the latching loopback control mechanism according to the present invention is configured to selectively integrate one or more of a number of digital control code-based filtering routines into a latching loopback test code sequence-based scheme, of the type that uses a set of successively repeated different code sequences, such as that shown in FIG. 2, so as to prevent or filter out unauthorized data-induced latching loopback in a digital data device. The filtering routines of the invention include:

1—an intra loopback establishment filtering routine termed 'invalid byte' or 'garbage byte' detection;

2—a time-out invoking, flag byte-based filtering routine, termed 'protected loopback'; and 3—a precursor code-based routine, termed 'preamble', that may be initiated to override or terminate the timeout invoked in the protected loopback routine.

The following description will detail the operation and manner of integration of each filtering routine, both individually and collectively, into such a multicode sequence-based loopback latching mechanism.

1—GARBAGE BYTE DETECTION (FIGS. 7–9)

Figures 3, 4:
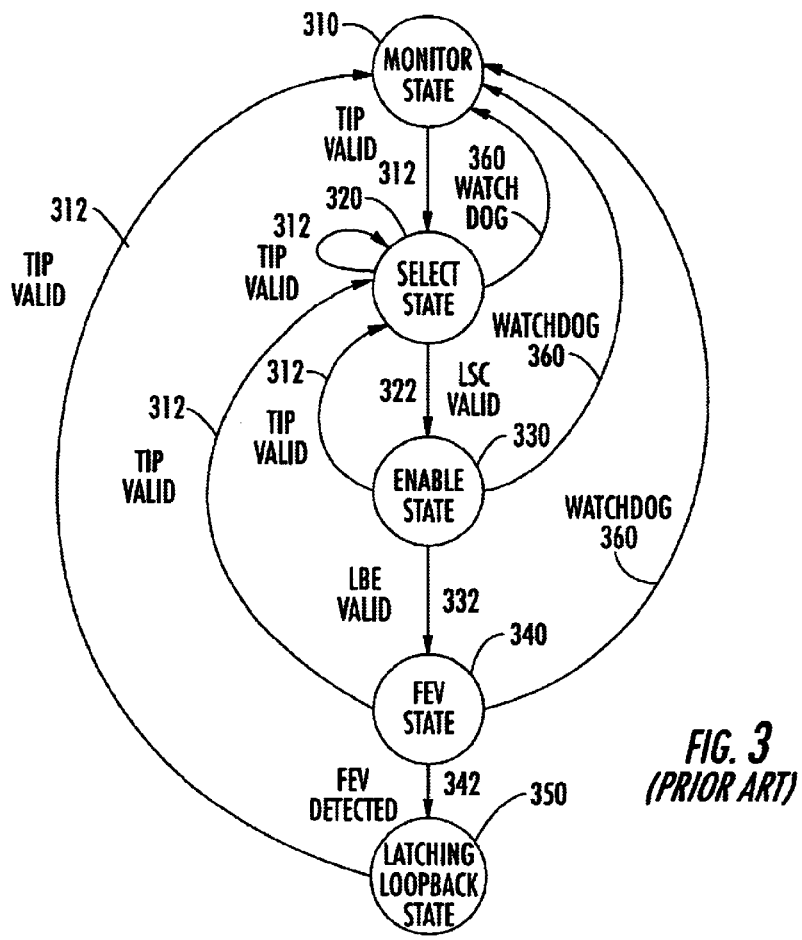
FIG. 3 is a state diagram showing the operation of a conventional latching loopback mechanism employed by a currently commercially available digital data device.
FIG. 4 shows a prior art state transition table associated with the state diagram of FIG. 3.
Figure 5:
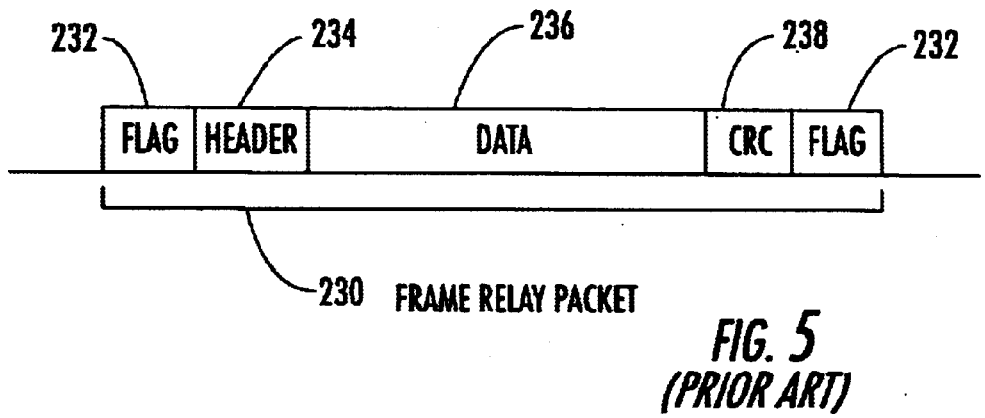
FIG. 5 shows the data format a frame relay packet.
Figure 6:
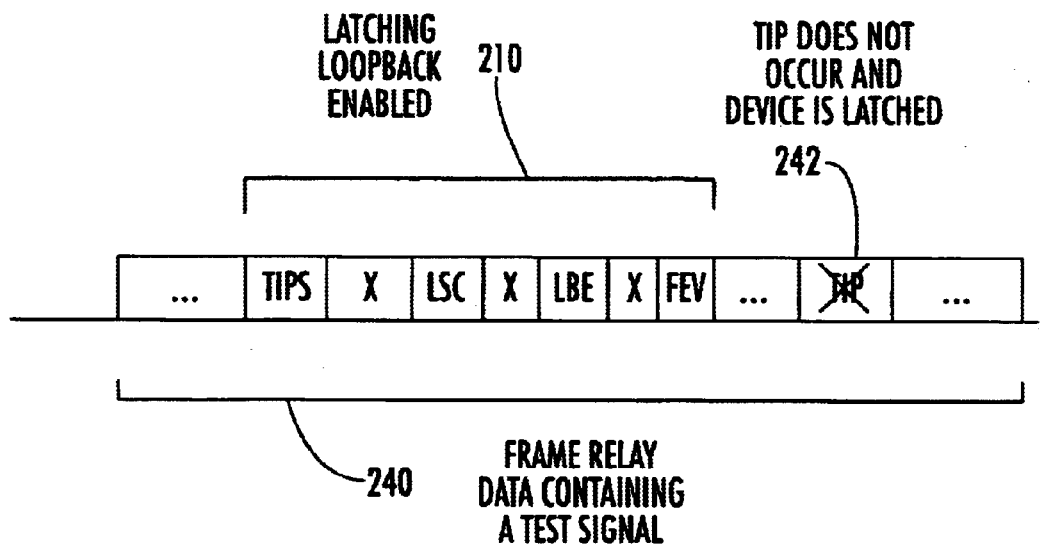
FIG. 6 shows a frame relay packet having a data field that contains the latching loopback test code sequence of FIG. 2.

As described previously, this intra-latching loopback subroutine serves to limit the type of customer data that may be received between the successively repeated control bytes of a valid latching loopback sequence, such as the multicode sequence shown in FIG. 2 and the state diagram of FIG. 3, and thereby minimize the possibility of a latching loopback being erroneously triggered. The manner in which the garbage byte subroutine of the invention may be integrated into the latching loopback sequence of the state diagram of FIG. 3 is shown in the state diagram of FIG. 7, having the associated state transition table shown in FIG. 8.

Figures 7, 8:
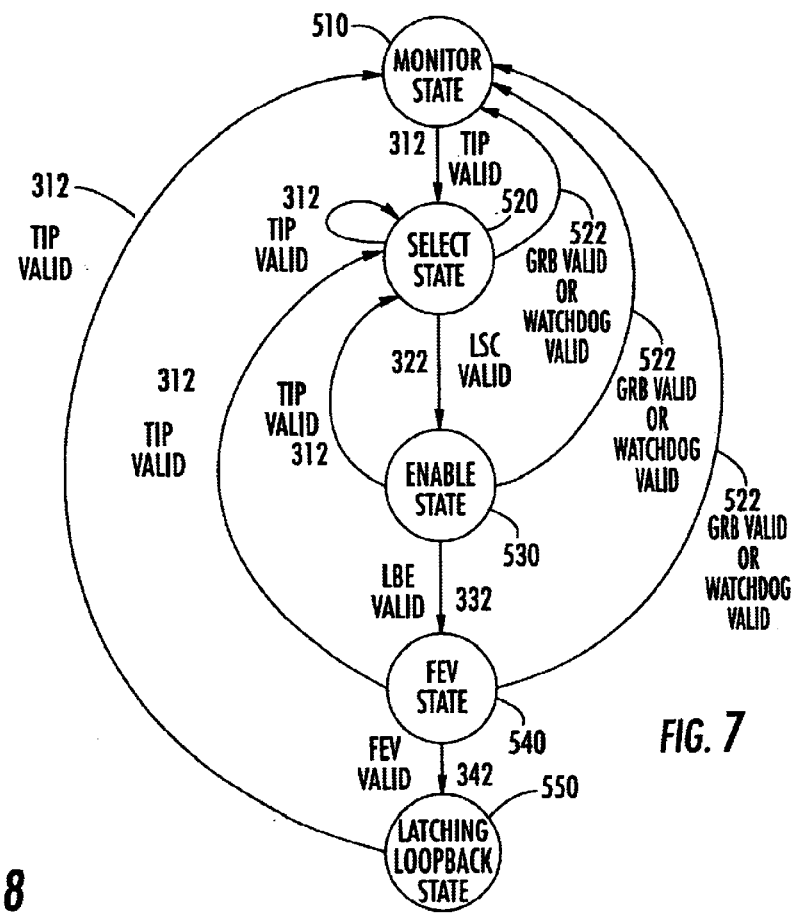
FIG. 7 is a state diagram showing the operation of a latching loopback mechanism employing the 'invalid byte' filtering routine of the invention.
FIG. 8 shows a state transition table associated with the state diagram of FIG. 7.
Figure 9:
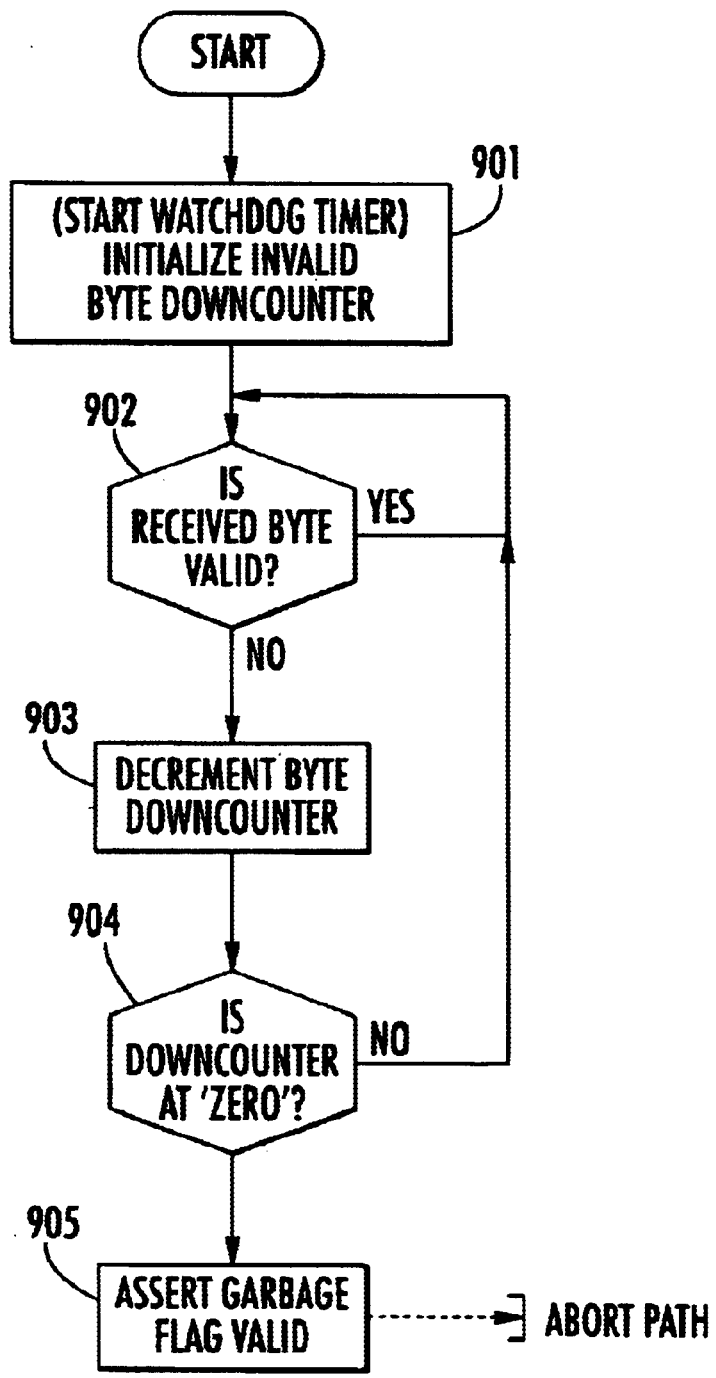
FIG. 9 is a flow chart of a 'garbage' byte detector/filter subroutine.

The respective states of the state diagram of FIG. 7—monitor state 510, select state 520, enable state 530, FEV state 540, and latching loopback state 550—correspond to the respective states 310, 320, 330, 340 and 350 of the state diagram of FIG. 3, but has each of its respective select, enable and far end voice states 520, 530 and 540 modified to incorporate 'garbage' or invalid byte detection. Pursuant to this first aspect of the invention, whenever the loopback latching routine transitions to any of states 520, 530 or 540, an invalid or 'garbage' byte detector/filter shown in the subroutine flow chart of FIG. 9 is invoked.

As shown therein, at a first step 901, in addition to starting the watchdog timer referenced above, an invalid byte downcounter is initialized to a prescribed invalid byte 'tolerance' count value. This count value is associated with the number of invalid bytes that will be 'tolerated' or allowed to be received by the digital data services unit during the latching loopback state of interest without aborting the latching loopback routine. As a non-limiting example, the invalid byte downcounter may be initially set to a count of five. The number five has been empirically determined as effective to reduce the erroneous latching loopback problem.

It should be observed that the invention is not limited to this or any other number, nor need the counter be initialized to this or any particular number. Also, the counter may be either an upcounter or a downcounter. What is important is that there be provided a means of keeping track of the number of invalid bytes that are received by the digital data service unit in each respective one of the states 520, 530 and 540. Initializing a downcounter to a tolerance value and counting down or decrementing from this initial value to zero is a practical mechanism to track the number of received invalid bytes. Also, an invalid byte (also referred to as a 'garbage' byte) may be a byte other than the control code pattern of the next byte in the latching loopback sequence, or a byte pattern of one or more one byte code exceptions that have been determined not to have affect the latching loopback mechanism.

Next, in query step 902, as a respective byte is received, it is examined to determine whether it satisfies the above-referenced valid byte criteria for the particular state of the digital data services device. As pointed out above, the term 'garbage' byte has meaning when in states 520, 530, and 540. When in the select state 520, the next expected (LSC) sequence is a sequence of repeated LSC bytes; therefore, when in this state, if the examined byte is not an LSC byte or one of the above-listed byte code exceptions, the byte is considered to be a garbage byte. Similarly, in the enable state 530, the next expected (LBE) sequence is the sequence; therefore, in this state any byte that is not a LBE byte or one of the above-listed byte code exceptions, the byte is a garbage byte.

Finally, when in state 540, each byte of the next expected sequence is an FEV byte; therefore when in this state if a received byte is not an FEV byte or one of the above exceptions, the byte is a considered to be a garbage byte. Thus, if the received byte is a next expected byte or one of the exceptions, it is a valid byte and the answer to query step 902 is YES. In this case, the subroutine performs step 902 for the next received byte. However, when the answer to query step 902 is NO (the received byte is invalid), the subroutine transitions to step 903, wherein the contents of the invalid counter are decremented by one.

Next, in step 904, the contents of the invalid counter are examined. If the number of detected invalid bytes received during the state of interest is less than the tolerance number, the answer to query step 904 is NO, and the subroutine transitions back to step 902 for the next received byte. However, if the invalid byte counter has been decremented to a prescribed value (e.g., zero), the subroutine transitions to step 905, which asserts a garbage flag GRB valid, and causes the latching loopback to be aborted along a respective abort path 522 from the particular state of the digital data service device in the state diagram of FIG. 7. In addition, regardless of the state of the invalid byte counter, if the watchdog timer times out before a prescribed number of next expected bytes have been received, a watchdog flag is asserted valid, causing the latching loopback to be aborted along the abort path 522, as pointed out above.

2—LOOPBACK PROTECTION (FIG. 10)

The loopback protection mechanism of the invention is employed to controllably disable, for a prescribed period of time, a digital control code sequence-driven latching loopback mechanism, whenever a predetermined character associated with a frame of customer data is detected. As a non-limiting example, a digital control code sequence-driven latching loopback mechanism with which the loopback protection mechanism of the invention may be used includes a conventional digital control code sequence-driven latching loopback mechanism of the type shown in the state diagram of FIG. 3, and one which employs the garbage byte subroutine of the invention shown in the state diagram of FIG. 7. A non-limiting example of a data transport scheme where this protection scheme has particular utility is (64K) frame relay, which uses HDLC protocol, and has ($7E_{HEX}$) flag bytes at the beginning and end of each data packet.

As a non-limiting but preferred example, the period of time during which latching loopback may be disabled in this mode corresponds to the maximum length of a frame; in frame relay, the maximum frame length is 8192 bytes. Thus, in the context of a digital data service device being an OCUDP, once a frame relay flag byte is detected, a byte counter is enabled to count 8192 successive DS0 bytes. During this byte count interval, the digital data service device will be unable to perform a control byte sequence-initiated latching loopback (unless the loopback capability has been re-enabled by the 'preamble' mechanism of the precursor code-based routine, to be described).

Figure 10:
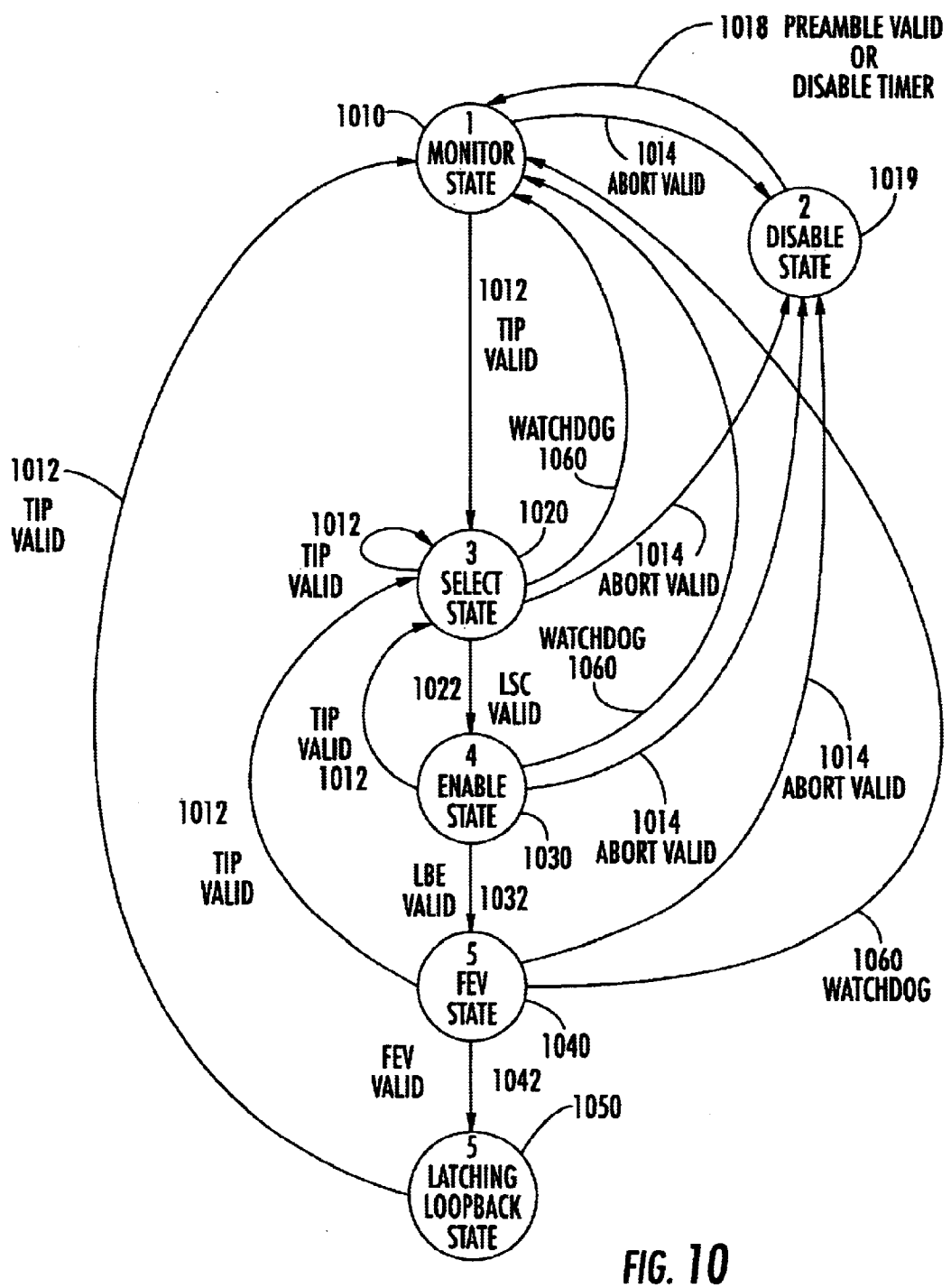
FIG. 10 is a state diagram showing the operation of a protected latching loopback mechanism employing the 'flag byte' filtering routine and preamble detection of the invention.

The manner in which the loopback protection subroutine of the invention may be integrated into a latching loopback sequence of the type shown in FIG. 3 is illustrated in the state diagram of FIG. 10. The respective states of the state diagram of FIG. 10—monitor state 1010, select state 1020, enable state 1030, FEV state 1040, and latching loopback state 1050—correspond to respective states 310, 320, 330, 340 and 350 of the state diagram of FIG. 3. In addition, a disable state 1019 can be reached from the monitor state, the select state, or the FEV state. Similar to the state diagram of FIG. 7, whenever the latching loopback routine is in states 1010, 1020, 1030, or 1040, an additional function is performed.

More particularly, a determination is made whether each received (DS0) byte is a flag byte ($7E_{HEX}$). If so, an abort flag ABRT is asserted valid, causing the latching loopback to be aborted to the disable state 1019 along a respective abort path 1014 from the particular state of the digital data service device in the state diagram. In addition, as in the state diagrams of FIGS. 3 and 7, regardless of whether a particular DS0 byte is a frame relay flag byte, if the watchdog timer for that state times out before a prescribed number of next expected bytes of the latching loopback sequence have been received, a watchdog timer flag is asserted valid, causing the latching loopback routine to be aborted along the watchdog path 1060 to the monitor state.

Once the latching loopback routine has been aborted to the disable state 1019, the ability of the digital data service device to perform a control byte sequence-initiated latching loopback is inhibited for a prescribed period of time. As described above, this period of time is preferably set to the maximum length of a frame, which for frame relay is 8192 bytes. Thus, when detection of a frame relay flag byte aborts the operational state of the device to the disable state 1019, as described above, a byte counter begins counting successive DS0 bytes.

Normally, while in the disable state 1019, the digital data service device is unable to perform a control byte sequence-initiated latching loopback of the type described above, until the byte count reaches a prescribed count (e.g., 8192 DS0 bytes). Not until a full frame of DS0 bytes has been counted is the capability of the device to conduct the digital control code sequence-driven latching loopback mechanism shown in FIG. 2 re-enabled. However, pursuant to a third aspect of the invention, shown in the state diagram of FIG. 10, described below, a precursor code-based routine, termed 'preamble', may be controllably initiated to override this byte count based timeout.

3—PREAMBLE (FIG. 10)

An additional method of returning from the disable state to the monitor state is provided to enhance compatibility with existing digital data test systems. More particularly, when a valid preamble sequence containing a plurality of preamble byte codes is detected in the disable state 1019, a transition will occur to the monitor state. As a non-limiting example, a preamble byte code may correspond to an idle byte (S1111110), since, according to telecommunication industry specifications, an idle byte code cannot occur in random data contained in a frame relay frame.

As with the other repeated bytes of a latching loopback sequence, only if a prescribed majority M out of N PREAMBLE sequence (e.g., M/N=31/32) is detected by the digital data service device's control processor, will a PREAMBLE VALID transition 1018 from the disable state to the monitor state 1010 be invoked. When a PREAMBLE VALID condition occurs, the DS0 byte counter used for the abort time out of the loopback protection feature, described above, is immediately cleared, which allows the conditional operational state of the device to transition from its disable state 1019 to the monitor state 1010. Once in the monitor state 1010, the latching loopback sequence may be detected in the same manner as described above with reference to the state diagrams of FIGS. 3 and 7.

As will be appreciated from the foregoing description of the invention, the inability of a TR 62310-suggested watchdog timer to significantly reduce the occurrence of data induced latching loopbacks in a digital data services device is effectively obviated by integrating digital control code-based filtering routines into a test code sequence-based latching loopback scheme. The garbage byte detection routine limits the type of customer data that may be received between sequences of repeated control bytes of a valid latching loopback sequence, while the protected loopback routine disables latching loopback whenever a predetermined character associated with a frame of 64K frame relay customer data is detected. The preamble routine allows the timeout of the frame relay protected loopback routine to be selectively terminated, so that latching loopback may be immediately re-enabled. As the disable state will be entered, and the monitor state cannot be reached during data transfer using the majority of currently employed data protocols, the addition of the disable state essentially eliminates the likelihood of occurrence of a data-induced latching loopback lockup.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. For use with a digital data communication device that is controllably operative to provide a latching loopback for a communication link in response to receipt of a sequence of different repeated digital control codes from said communication link, a method for controlling the ability of said digital data communication device to provide said latching loopback comprising the steps of:

(a) monitoring said communication link for said repeated digital control codes and, in response to detecting a prescribed plurality of an ith repeated digital control code of said sequence, monitoring said communication link for said prescribed plurality of an (i+1)th repeated digital control code of said sequence; and (b) in response to detecting a flag byte, aborting step (a), so as to discontinue monitoring said communication link for said sequence.

2. A method according to claim 1, wherein step (b) comprises discontinuing monitoring said communication link for said sequence for a predetermined period of time subsequent to detecting said flag byte.

3. A method according to claim 2, wherein said predetermined period of time is sufficient to cover a maximum sized frame relay frame.

4. A method according to claim 1, wherein step (b) further comprises reinitiating step (a) so as to monitor said communication link for said sequence, in response to receipt of a further repeated digital code that is not one of the digital control codes of said sequence.

5. A method according to claim 4, wherein said further repeated digital code is an idle byte representative code.

6. A method according to claim 4, wherein said further repeated digital code is the byte X111 1110, where X is a don't care bit.

7. For use with a digital data service device for interfacing digital communication signals with a communication link, and being is controllably operative to provide a latching loopback for a communication link in response to receipt of a sequence of different repeated digital control codes from said communication link, a method of preventing digital data signals from causing said digital data service device to erroneously provide said latching loopback comprising the steps of:

(a) monitoring said communication link and, in response to detecting a flag byte, disabling the ability of said digital data service device to provide said latching loopback for a prescribed period of time; and (b) in response to receipt of a further repeated digital code that is not one of the digital control codes of said sequence, re-enabling the ability of said digital data service device to provide said latching loopback by monitoring and detecting said sequence.

8. A method according to claim 7, wherein step (b) further comprises, in the course of monitoring said communications link for a respective one of said different repeated digital control codes, in response to detecting a prescribed number of invalid codes that are not one of said different repeated digital control codes, prior to detecting said respective one of said different repeated digital control codes, discontinuing monitoring said communication link for said sequence.

9. A method according to claim 7, wherein said predetermined period of time is sufficient to cover a maximum sized frame relay frame.

10. A method according to claim 7, wherein said further repeated digital code is an idle byte representative code.

11. A method according to claim 7, wherein said further repeated digital code is the byte X111 1110, where X is a don't care bit.

12. For use with a digital data communication device that is controllably operative to provide a latching loopback for a communication link in response to receipt of a sequence of different repeated digital control codes from said communication link, a method for controlling the ability of said digital data communication device to provide said latching loopback comprising the steps of:

(a) monitoring said communication link for said repeated digital control codes and, in response detecting a prescribed plurality of an ith repeated digital control code of said sequence, monitoring said communication link for said prescribed plurality of an (i+1)th repeated digital control code of said sequence; and (b) in response to detecting a prescribed number of invalid codes that are not said (i+1)th digital control code, prior to detecting said prescribed plurality of said (i+1)th repeated digital control code, discontinuing monitoring said communication link for said sequence.

13. A method according to claim 12, wherein step (b) further comprises, in response to the elapse of a predetermined period of time after detecting said prescribed plurality of an ith repeated digital control code of said sequence, prior to detecting said prescribed plurality of said (i+1)th repeated digital control code, discontinuing monitoring said communication link for said sequence.

14. A method according to claim 12, wherein said invalid codes are exclusive of an idle byte representative code.

15. A method according to claim 14, wherein said idle byte representative is the byte X111 1110, where X is a don't care bit.

16. For use with a digital data communication device that is controllably operative to provide a latching loopback for a communication link in response to receipt of a sequence of different digital control codes from said communication link, a method for controlling the ability of said digital data communication device to provide said latching loopback comprising the steps of:

(a) monitoring said communication link for said sequence; and (b) in response to detecting said sequence, providing said latching loopback, but in response to receipt of a first digital code other than a next successive digital control code of said sequence, discontinuing to monitor said communication link for said sequence.

17. A method according to claim 16, wherein step (b) comprises discontinuing to monitor said communication link for said sequence for a predetermined period of time subsequent to receipt of said first digital code.

18. A method according to claim 17, wherein said predetermined period of time is sufficient to cover a maximum sized frame relay frame.

19. A method according to claim 16, wherein said first digital code is a flag character byte.

20. A method according to claim 16, wherein step (b) comprises monitoring said communication link for successive digital control codes of said sequence, in response to receipt of a second digital code other than a respective digital control code of said sequence.

21. A method according to claim 16, wherein step (b) comprises, in response to receipt of a second digital code other than a respective digital control code of said sequence, terminating said discontinuing to monitor said communication link for said sequence, and reinitiating monitoring of said communication link for said sequence.

22. A method according to claim 16, wherein step (b) comprises enabling step (a) to monitor said communication link for digital control codes of said sequence, and providing said latching loopback in response to detecting said sequence, only after receipt of a second digital code that differs from each digital control code of said sequence.

23. A method according to claim 22, wherein said second digital code is an idle byte representative code.

24. A method according to claim 22, wherein said second digital code is the byte X111 1110, where X is a don't care bit.

25. A method according to claim 16, wherein step (b) comprises, in response to detecting a prescribed number M of repeated ones of a respective ith digital control code of said sequence, monitoring said communication link for said prescribed number M of repeated ones of an (i+1)th digital control code of said sequence, but discontinuing to monitor said communication link for said prescribed number M of repeated ones of said (i+1)th digital control code, in response to either receipt of a selected number of digital codes, that are not said (i+1)th digital control code, prior to detecting said prescribed number M of repeated ones of said (i+1)th digital control code, or expiration of a time out after detecting said prescribed number M of repeated ones of a respective ith digital control code.

26. A method according to claim 16, wherein step (b) further comprises, subsequent to receipt of a digital control code of said sequence, discontinuing to monitor said communication link for additional one or more subsequent digital control codes of said sequence, in response to receipt of selected number of digital codes that are not the next successive digital control code of said prescribed sequence.

27. A method according to claim 26, wherein step (b) further comprises discontinuing to monitor said communication link for additional one or more digital control codes of said sequence, in response to expiration of a time out after receipt of a digital control code of said sequence.

28. For use with a digital data communication device that is controllably operative to provide a latching loopback for a communication link in response to receipt of a sequence of different digital control codes from said communication link, a method for controlling the ability of said digital data communication device to provide said latching loopback comprising the steps of:

(a) monitoring said communication link for a first digital code that differs from each digital control code of said sequence; and (b) in response to detecting said first digital code, monitoring said communication link for digital control codes of said sequence.

29. A method according to claim 28, wherein said second digital code is an idle byte representative code.

30. A method according to claim 29, wherein said predetermined digital code is the byte X111 1110, where X is a don't care bit.

31. For use with a digital data communication device that is controllably operative to provide a latching loopback for a communication link in response to receipt of a sequence of different digital control codes from said communication link, a method for controlling the ability of said digital data communication device to provide said latching loopback comprising the steps of:

(a) monitoring said communication link for said sequence; and (b) in response to detecting a prescribed number M of repeated ones of a respective ith digital control code of said sequence, monitoring said communication link for said prescribed number M of repeated ones of an (i+1)th digital control code of said sequence, but discontinuing to monitor said communication link for said prescribed number M of repeated ones of said (i+1)th digital control code, in response to receipt of a selected number of digital codes that are not said (i+1)th digital control code, prior to detecting said prescribed number M of repeated ones of said (i+1)th digital control code.

32. A method according to claim 31, wherein step (b) further comprises discontinuing to monitor said communication link for said prescribed number M of repeated ones of said (i+1)th digital control code, in response to expiration of a time out after detecting said prescribed number M of repeated ones of a respective ith digital control code.

33. For use with a digital data communication device installable in a communication link and controllably providing a latching loopback between first and second communication directions of said communication link in response to receipt of a prescribed sequence of different digital control codes from said communication link, a method for preventing said digital data communication device from being placed in an unauthorized latching loopback condition comprising the steps of:

(a) monitoring said communication link for said prescribed sequence of respectively different digital control codes and, in response to detecting each respectively different digital control code of said sequence, providing said latching loopback between said first and second communication directions of said communication link; and (b) controllably continuing to monitor said communication link for successive ones of said prescribed sequence of digital control codes, in response to receipt of a digital code other than a respective digital control code of said prescribed sequence of different digital control codes.

34. A method according to claim 33, wherein step (b) comprises controllably continuing to monitor said communication link for digital control codes of said prescribed sequence of digital control codes, in response to receipt of a predetermined digital code other than any of said different digital control codes.

35. A method according to claim 34, wherein step (b) further comprises controllably discontinuing to monitor said communication link for one or more digital control codes of said prescribed sequence of digital control codes, in response to receipt of at least one digital code other than a next successive digital control code of said prescribed sequence of digital control codes.

36. A method according to claim 35, wherein step (b) further comprises, subsequent to receipt of said one or more digital control codes of said prescribed sequence of digital control codes, discontinuing to monitor said communication link for additional one or more subsequent digital control codes of said prescribed sequence of digital control codes, in response to receipt of a predetermined digital code that is not a digital control code of said prescribed sequence of digital control codes, or in response to receipt of at least one digital code other than the next successive digital control code of said prescribed sequence of digital control codes.

37. A method according to claim 35, wherein step (b) further comprises, subsequent to receipt of said one or more digital control codes of said prescribed sequence of digital control codes, discontinuing to monitor said communication link for additional one or more subsequent digital control codes of said prescribed sequence of digital control codes, in response to receipt of a predetermined digital code that is not a digital control code of said prescribed sequence of digital control codes, or in response to receipt of a selected number of digital codes that are not the next successive digital control code of said prescribed sequence of digital control codes.

* * * * *